US009066282B2

(12) United States Patent
Shon et al.

(10) Patent No.: US 9,066,282 B2
(45) Date of Patent: Jun. 23, 2015

(54) APPARATUS AND METHOD FOR SELECTING WPAN BASED ADAPTIVE RF INTERFACE

(75) Inventors: Tae-shik Shon, Suwon-si (KR); Jeong-sik In, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 872 days.

(21) Appl. No.: 13/189,831

(22) Filed: Jul. 25, 2011

(65) Prior Publication Data

US 2012/0020298 A1 Jan. 26, 2012

(30) Foreign Application Priority Data

Jul. 23, 2010 (KR) ........................ 10-2010-0071608

(51) Int. Cl.
*H04W 48/18* (2009.01)
*H04W 88/06* (2009.01)

(52) U.S. Cl.
CPC .............. *H04W 48/18* (2013.01); *H04W 88/06* (2013.01)

(58) Field of Classification Search
CPC ..... H04W 36/14; H04W 36/24; H04W 36/34; H04W 36/36
USPC .......................................... 370/331, 332, 334
See application file for complete search history.

(56) References Cited

U.S. PATENT DOCUMENTS

2001/0046879 A1* 11/2001 Schramm et al. ............. 455/525
2004/0242235 A1* 12/2004 Witana ....................... 455/452.2
2006/0084417 A1* 4/2006 Melpignano et al. ......... 455/418
2007/0253339 A1* 11/2007 Ovadia et al. ................. 370/252
2008/0064401 A1* 3/2008 Forssell et al. ................ 455/436
2008/0095120 A1* 4/2008 Hong et al. ................... 370/332
2008/0310332 A1* 12/2008 Hansen et al. ................ 370/310
2008/0310354 A1* 12/2008 Hansen et al. ................ 370/329
2008/0310394 A1* 12/2008 Hansen et al. ................ 370/350
2009/0154426 A1* 6/2009 Perraud et al. ................ 370/332
2010/0040025 A1* 2/2010 Karaoguz et al. ............. 370/331
2014/0149873 A1* 5/2014 Wilson et al. ................. 715/736

FOREIGN PATENT DOCUMENTS

JP 2003-169375 A 6/2003
WO 2007/070782 A2 6/2007

* cited by examiner

*Primary Examiner* — Brandon Renner
*Assistant Examiner* — Scott M Sciacca
(74) *Attorney, Agent, or Firm* — Sughrue Mion, PLLC

(57) ABSTRACT

A method and apparatus for selecting a wireless personal area network (WPAN) based adaptive radio frequency (RF) interface. The method includes obtaining RF interface information by establishing a WPAN based network connection with a target RF device; selecting an RF interface from among a plurality of RF interfaces using the obtained RF interface information, based on characteristics of applications and a network load; and establishing the selected RF interface by negotiating about the selected RF interface with the target RF device.

16 Claims, 8 Drawing Sheets

| BITS | RF TYPE |
| --- | --- |
| 0001 | Wi-Fi |
| 0010 | Bluetooth |
| 0100 | UWB |
| 1000 | ··· |

440

| BITS:0 | 1 | 2 | 3 | 4~7 |
| --- | --- | --- | --- | --- |
| NODE TYPE | POWER SOURCE | SECURITY CAPABLE | CHANNEL NORMALIZAITON CAPABLE | RESERVED |

TABLE 36-NWK COMMAND FRAMES

| COMMAND FRAME IDENTIFIER | COMMAND NAME | SUB-CLAUSE |
|---|---|---|
| 0x01 | DISCOVERY REQUEST | 3.3.1 |
| 0x02 | DISCOVERY RESPONSE | 3.3.2 |
| 0x03 | PAIR REQUEST | 3.3.3 |
| 0x04 | PAIR RESPONSE | 3.3.4 |
| 0x05 | UNPAIR REQUEST | 3.3.5 |
| 0x06 | KEY SEED | 3.3.6 |
| 0x07 | PING REQUEST | 3.3.7 |
| 0x08 | PING RESPONSE | 3.3.8 |
| 0x09~0xff | RESERVED | - |

| 0x0A | Request_Setup_RFIF |
|---|---|
| 0x0B | Response_Setup_RFIF |

APPARATUS AND METHOD FOR SELECTING WPAN BASED ADAPTIVE RF INTERFACE

CROSS-REFERENCE TO RELATED PATENT APPLICATION

This application claims the benefit of Korean Patent Application No. 10-2010-0071608, filed on Jul. 23, 2010, in the Korean Intellectual Property Office, the disclosure of which is incorporated by reference herein in its entirety.

BACKGROUND

1. Field

Apparatuses, methods, and devices consistent with the present disclosure relate to a radio frequency (RF) interface control system relating to a communication link between wireless devices, and more particularly, to selecting a wireless personal area network (WPAN) based adaptive RF interface.

2. Description of the Related Art

Recently, attempts to provide a variety of convergence services by easily and conveniently connecting client devices such as televisions (TVs), Digital Versatile Disc (DVD) players, compact disk (CD) players, air conditioners, etc. and wirelessly connecting various information technology (IT) devices such as mobile terminals, notebook personal computers (PCs), etc., and user demand for the above services have increased.

A wireless personal area network (WPAN) enables users to communicate information between each other within a relatively short distance and between peripheral devices without a cable.

The IEEE 802.15.4 standard is a standard which specifies a physical layer and a data link layer for low rate WPANs.

The EEE 802.15.4 standard is a protocol aiming at a row rate communication band and low power consumption and is designed for devices of a WPAN having a relatively short transmission distance and is the most suitable communication method for realizing a wireless network system.

Meanwhile, the ZigBee radio frequency for consumer electronics (RF4CE) standard is designed for various products such as illumination controllers, security monitoring systems, keyless entry systems, etc. and home entertainment appliances such as high definition television (HDTV), home theater equipment, settop boxes, other audio equipment, etc. as well, based on a WPAN IEEE 802.15.4 physical layer/media access control (PHY/MAC) radio technology by using a 2.4 GHz frequency.

An RF remote controller realized according to the ZigBee RF4CE standard is developed to replace a previously used infrared remote controller. The ZigBee RF4CE based RF remote controller can freely operate devices at far distances irrespective of obstacles and provides a long battery lifetime compared to the infrared remote controller. Furthermore, the ZigBee RF4CE based RF remote controller is suitable for a data broadcasting service since two-way communication is possible.

However, a technology of controlling an RF interface between wireless devices by using an out of band (OOB) control channel according to the ZigBee RF4CE standard has not yet been disclosed.

SUMMARY

Exemplary embodiments provide a method and apparatus for selecting a WPAN based adaptive radio frequency (RF) interface by using an out of band (OOB) control channel according to the ZigBee radio frequency for consumer electronics (RF4CE) standard.

According to an aspect of an exemplary embodiment, there is provided a method of selecting a wireless personal area network (WPAN) based adaptive radio frequency (RF) interface, the method including obtaining RF interface information by establishing a WPAN based network connection with a target RF device; selecting an RF interface from among a plurality of RF interfaces using the obtained RF interface information, based on characteristics of applications and a network load; and establishing the selected RF interface by negotiating about the selected RF interface with the target RF device.

The method may further include attempting to establish an RF interface of a network so as to select the RF interface by investigating a current status of the network while the applications are available.

The attempting to establish the RF interface of the network may include determining a current availability status of the network periodically or according to a request; determining whether the RF interface is available according to the determined current availability status of the network; and if it is determined that the RF interface is unavailable, searching for another RF interface by attempting to establish the network connection using the another RF interface.

The establishing of the WPAN based network connection may include performing WPAN discovery and pairing between a control RF device and the target RF device.

The performing of the WPAN discovery and pairing may include providing RF interfaces between the control RF device and the target RF device by using a previously established network node qualification field.

The selecting of the RF interface may include: determining levels of applications that are to be used; selecting an RF interface having a maximum bandwidth based on a current network load; aligning other RF interfaces according to their bandwidths; and determining an optimal RF interface by comparing the selected RF interface having the maximum bandwidth with maximum requirement bandwidths of the applications.

The determining of the levels of applications may include prioritizing the applications that are to be used according to characteristics of services of the applications and determining the levels of applications by reflecting a weight on an average packet size (APS) of the applications.

The determining of the optimal RF interface may include, if the bandwidth of the selected RF interface is greater than a minimum requirement bandwidth (MRB) of the applications, determining the selected RF interface as the optimal RF interface, and if the bandwidth of the selected RF interface is not greater than the MRB of the applications, calculating an expected bandwidth of a next candidate RF interface and determining whether the next candidate RF interface can accommodate the MRB of the applications.

The expected bandwidth of a next candidate RF interface may be given by the equation: Expected bandwidth of next candidate RF interface=(bandwidth of current RF interface× W1)+(AFR×W2)+(APR+W3), wherein, W1~W3 denote weights used to select an RF interface, an average flow rate (AFR) denotes an APS while data is provided, and average packet rate (APR) denotes an amount of packets while the data is provided.

The negotiating about the selected RF interface may include: selecting the RF interface, sending information regarding the selected RF interface to the target RF device, and receiving a message indicating whether to establish the selected RF interface from the target RF device.

The negotiating about the selected RF interface may include exchanging a PING message to determine whether the target RF device is within a communication radius of the selected RF interface.

If it is determined that the target RF device is within the communication radius of the selected RF interface, the control RF device may transmit data to the target RF device through the selected RF interface, and, if it is determined that the target RF device is not within the communication radius of the selected RF interface, the control RF device may request the target RF device to connect a next priority RF interface.

Whether the target RF device is within the communication radius of the selected RF interface may be determined by using a response received from the target RF device.

According to another aspect of an exemplary embodiment, there is provided an apparatus for selecting a WPAN based adaptive RF interface, the apparatus including a network connection establishing unit that obtains an RF interface information by establishing a WPAN based network connection with a target RF device; an RF interface selection unit that selects an RF interface from the RF interface information obtained from the network connection establishing unit based on characteristics of applications and a network load; and an RF interface negotiation unit that establishing the RF interface by negotiating about the RF interface selected by the RF interface selection unit with the target RF device.

According to another aspect of an exemplary embodiment, there is provided an RF device including a communication unit comprising a plurality of RF interfaces, each RF interface using a different interface method; a control unit that selects an RF interface of the plurality of RF interfaces, using RF interface information obtained through a WPAN network connection based on characteristics of applications and a network load; and wherein the communicating unit communicates data used for communication setup in order to perform RF communication, to the RF interface selected by the control unit.

The RF device may further include a display unit that displays a type of the RF interface selected by the control unit.

The control unit may include a network connection establishing unit that obtains RF interface of a target RF device by establishing a WPAN based network connection with the target RF device; an RF interface selection unit that selects an RF interface from the RF interface information obtained from the network connection establishing unit based on the characteristics of the applications and the network load; and an RF interface negotiation unit that establishes the RF interface by negotiating about the RF interface selected by the RF interface selection unit with the target RF device.

According to another aspect of an exemplary embodiment, there is provided a computer readable recording medium having recorded thereon a program for executing a method including obtaining RF interface information by establishing a WPAN based network connection with a target RF device; selecting an RF interface from among a plurality of RF interfaces using the obtained RF interface information, based on characteristics of applications and a network load; and establishing the selected RF interface by negotiating about the selected RF interface with the target RF device.

BRIEF DESCRIPTION OF THE DRAWINGS

The above and other aspects will become more apparent by describing in detail exemplary embodiments thereof with reference to the attached drawings in which.

DETAILED DESCRIPTION

Hereinafter, aspects will be described in detail by explaining exemplary embodiments with reference to the attached drawings.

Figure 1A:
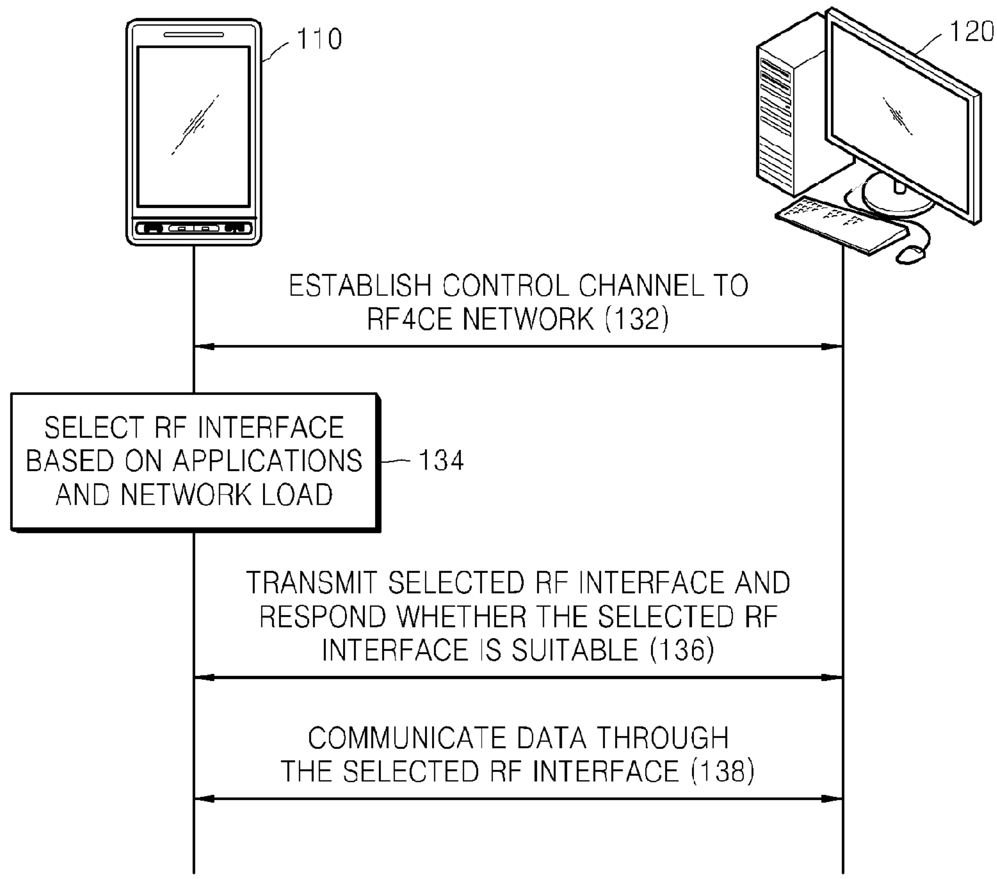
FIG. 1A is a flowchart of a signal used to select a radio frequency (RF) interface in a wireless personal area network (WPAN) system, according to an exemplary embodiment.

FIG. 1A is a flowchart of a signal used to select a radio frequency (RF) interface in a wireless personal area network (WPAN) system, according to an exemplary embodiment. Referring to FIG. 1A, the WPAN system includes a control RF device 110 and a target RF device 120.

The control RF device 110 may be, for example, a mobile terminal, such as a cellular phone, a PDA, etc. However, the present invention is not limited thereto.

The target RF device 120 may be, for example, a wireless communication device, such as a PC, a TV, etc. However, the present invention is not limited thereto.

The control RF device 110 and the target RF device 120 each includes RF interfaces, such as, for example, a Wi-Fi interface, a Bluetooth interface, a Wibro interface, a BT interface, a 3G interface, and a WiMedia Alliance interface, etc. The control RF device 110 and the target RF device 120 select the RF interface by using a control channel according to the ZigBee radio frequency for consumer electronics (RF4CE) standard.

The control RF device 110 performs the following communication with the target RF device 120 in order to select a WPAN based adaptive RF interface. The WPAN based adaptive RF interface may include a Wi-Fi interface, a Bluetooth interface, a WiMedia Alliance interface, etc. However, the present invention is not limited thereto.

The control RF device 110 establishes the control channel with the target RF device 120 according to the ZigBee RF4CE standard (operation 132).

Thereafter, the control RF device 110 selects the RF interface according to a status of applications and a network load (operation 143). For example, the control RF device 110 selects an optimal RF interface, i.e. any one of Wi-Fi, Bluetooth, Wibro, BT, 3G, WiMedia Alliances, according to the status of the applications and the network load.

Thereafter, the control RF device 110 transmits information regarding the selected RF interface to the target RF device 120, and the target RF device 120 transmits a response to whether the selected RF interface is suitable to the control RF device 110 (operation 136).

Thereafter, the control RF device 110 performs data communication with the target RF device 120 through the selected RF interface (operation 136).

Therefore, when a client device, which includes various RF interfaces (for example, Wi-Fi, Bluetooth, Wibro, BT, 3G, etc.), and IT devices execute a specific application, an optimal RF interface can be selected between various devices according to the characteristics of the application and a current network load, not by optionally establishing a manual configuration regarding respective devices but by using a low power consumption WPAN communication technology such as RF4CE.

Figure 1B:
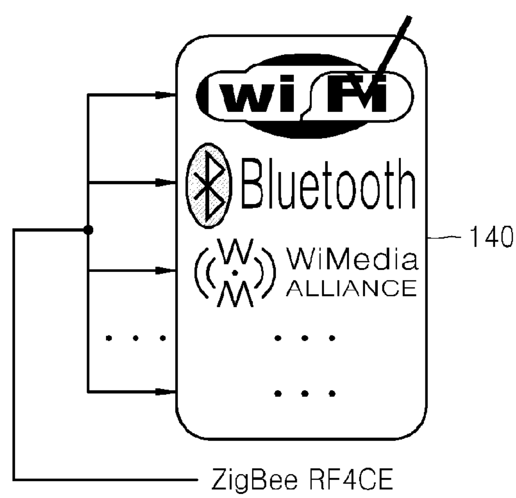
FIG. 1B shows an RF interface type selected by a control RF device and a target RF device according to the ZigBee radio frequency for consumer electronics (RF4CE) standard.

FIG. 1B shows an RF interface type selected by the control RF device 110 and the target RF device 120 according to the ZigBee RF4CE standard.

Referring to FIG. 1B, the control RF device 110 and the target RF device 120 select "Wi-Fi" from among a plurality of RF interfaces displayed on a screen 140 according to a status of applications and a network load.

Figure 2A:
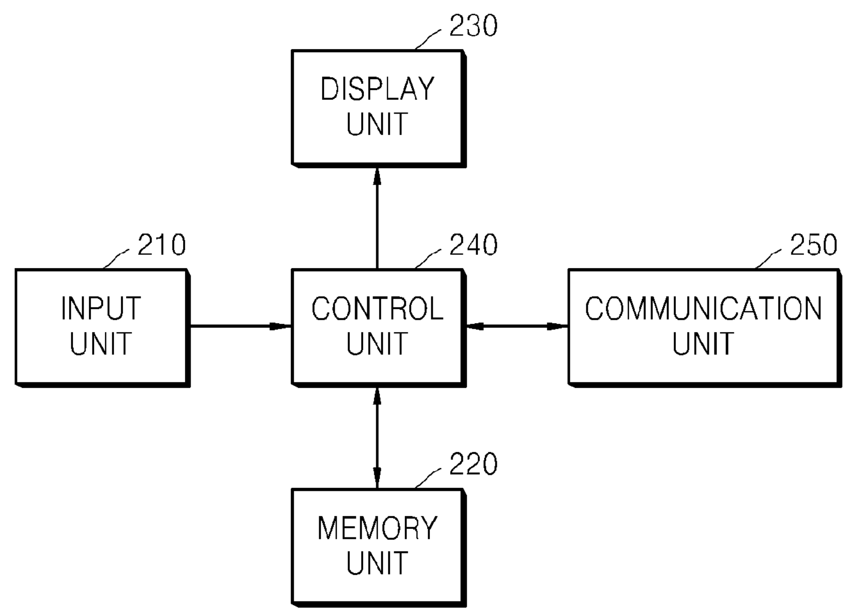
FIG. 2A is a detailed block diagram of a control RF device or a target RF device of FIG. 1A.

FIG. 2A is a detailed block diagram of the control RF device 110 or the target RF device 120 of FIG. 1A. The RF device 110 includes an input unit 210, a display unit 230, a control unit 240, a memory unit 220, and a communication unit 250.

The input unit 210 includes a key pad or a touch screen, a plurality of number and character input keys, a functional key for interfacing with a user, a calling key, and the like.

The input unit 210 controls a functional operation of a control unit 240 according to a key manipulation.

The memory unit 220 stores data used for a control operation of the control unit 240.

The memory unit 220 may be realized as at least one of a cache, a non-volatile memory device such as read only memory (ROM), programmable ROM (PROM), electrically erasable programmable ROM (EPROM), a volatile memory device such as random access memory (RAM), and a storage medium such as a hard disk drive. However, the present invention is not limited thereto.

The display unit 230 may include a liquid crystal display (LCD). The display unit 230 outputs various pieces of display data and text messages generated by the control unit 240. In particular, the display unit 230 displays an RF interface type selected by the control unit 240.

The control unit 240 obtains RF interfaces of the target RF device 120 by establishing a WPAN based network connection through a communication unit 250, selects an optimal RF interface from the obtained RF interfaces based on the characteristics of applications and a network load, negotiates about the selected RF interface with the target RF device 120, and transmits data through the negotiated RF interface through the communication unit 250.

The communication unit 250 is embedded with an RF interface such as a Wi-Fi interface, a Bluetooth interface, or a WiMedia Alliances interface, etc.

If the communication unit 250 is connected to the target RF device 120 through an RF4CE channel, the communication unit 250 communicates data used for communication setup with the target RF device 120 so as to perform near area wireless communication via the RF interface such as Wi-Fi or Bluetooth.

Figure 2B:
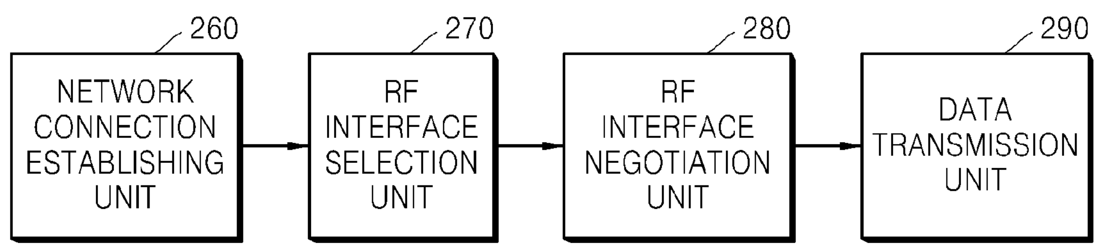
FIG. 2B is a block diagram of an apparatus for selecting a WPAN based adaptive RF interface included in a control unit of FIG. 2A.

FIG. 2B is a block diagram of an apparatus for selecting a WPAN based adaptive RF interface included in the control unit 240 of FIG. 2A. The apparatus includes a network connection establishing unit 260, an RF interface selection unit 270, an RF interface negotiation unit 280, and a data transmission unit 290.

The network connection establishing unit 260 establishes an RF4CE network connection with the target RF device 120 and obtains RF interfaces of the target RF device 120.

The RF interface selection unit 270 selects an RF interface from the RF interfaces obtained by the network connection establishing unit 260 based on the characteristics of applications and a network load.

The RF interface negotiation unit 280 transmits an RF interface establishment request through the RF interface selected by the RF interface selection unit 270, and receives an RF interface establishment response from the target RF device 120.

The data transmission unit 290 transmits data to the RF interface established by the RF interface negotiation unit 280.

Figure 3:
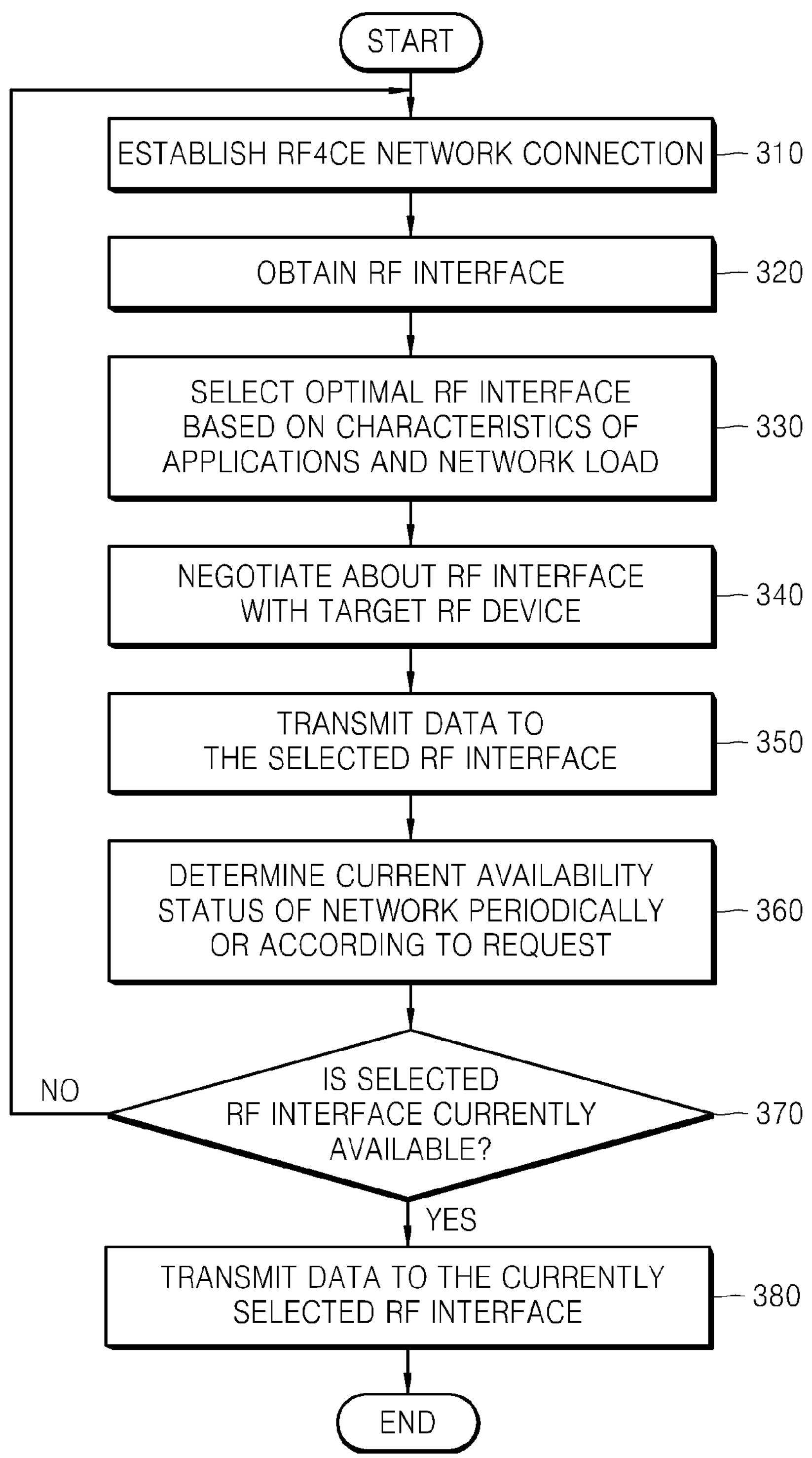
FIG. 3 is a flowchart of a method of selecting a WPAN based adaptive RF interface, according to an exemplary embodiment.

FIG. 3 is a flowchart of a method of selecting a WPAN based adaptive RF interface, according to an exemplary embodiment.

An RF4CE network connection is established between the control RF device 110 and the target RF device 120 (operation 310).

The control RF device 110 and the target RF device 120 perform a WPAN discovery and pairing process and provide their RF interfaces. (operation 320).

The control RF device 110 selects an optimal RF interface according to the characteristics of a currently used application and a network load (operation 330).

The control RF device 110 negotiates about the selected RF interface with the target RF device 120 and establishes the RF interface (operation 340). In this regard, the control RF device 110 and the target RF device 120 communicate an RF interface establishment request and response messages and establish the RF interface. The established RF interface is activated in the target RF device 120.

The control RF device 110 transmits data to the target RF device 120 via the established RF interface (operation 350).

The control RF device 110 determines the current availability status of a network periodically or according to a request, for example a request from a user. (operation 360).

The control RF device 110 determines whether the selected RF interface is currently available based on the current availability status of the network (operation 370).

More specifically, the control RF device 110 determines the current availability status of the network periodically or according to a request while an application is available, and determines whether the selected RF interface is currently available according to the determined current availability status of the network.

In this regard, if the selected RF interface is currently unavailable, the control RF device 110 attempts to establish an RF4CE network connection and searches for another appropriate RF interface. That is, if a more efficient RF interface than an initially established RF interface is found, the control RF device 110 attempts to establish a network RF interface.

If the selected RF interface is currently available, the control RF device 110 transmits data to the selected RF interface (operation 380).

Therefore, the above-described exemplary embodiment provides an optimal wireless connection between wireless devices by using an RF4CE network connection that is superior in terms of a pairing speed with respect to Wi-Fi and BT, the maximum number of connection nodes, a communication radius, and energy consumption.

Further, an optimal RF interface is selected according to the status of an application of each client and a network based on a low power consumption WPAN control technology such as RF4CE, thereby minimizing energy consumption and securing quality of service (QoS) of the application.

When the application is initially driven, a current network status is periodically determined by using an out of band (OOB) channel according to the RF4CE network connection, thereby selecting the optimal RF interface.

Figures 4A, 4B, 4C:
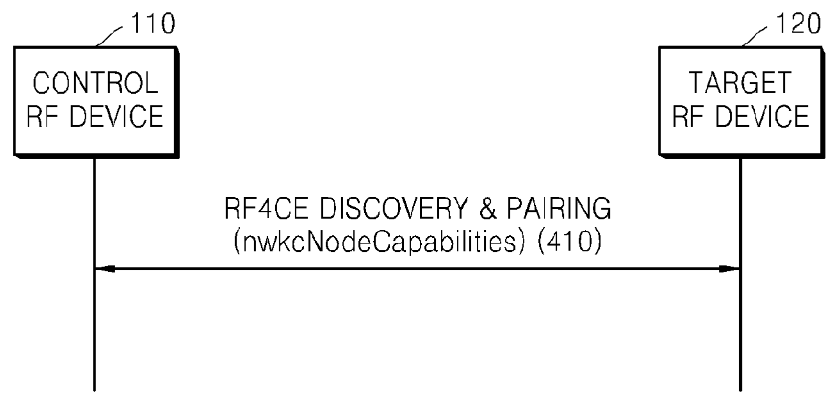
FIG. 4A is a flowchart of a signal used to exchange RF interface information during a process of establishing an RF4CE network connection of FIG. 3.
FIG. 4B illustrates the RF interface information of FIG. 4A.
FIG. 4C illustrates a format used to record RF interface information.

FIG. 4A is a flowchart of a signal used to exchange RF interface information during a process of establishing the RF4CE network connection of FIG. 3.

Referring to FIG. 4A, the control RF device 110 and the target RF device 120 perform an RF4CE discovery and pairing process (operation 410). More specifically, the control RF device 110 and the target RF device 120 provide RF interface information thereof by using an nwkc (network command) Node Capabilities field.

FIG. 4B illustrates the RF interface information of FIG. 4A.

Referring to FIG. 4B, the control RF device 110 defines a type of the RF interface information by using four bits. For example, bits "0001" correspond to "Wi-Fi", bits "0010" correspond to "Bluetooth", and bits "0100" correspond to "UWB". However, this is only an example. Moreover, the number of bits may be more or less depending on the number of types of RF interfaces.

FIG. 4C illustrates the nwkc Node Capabilities field for recording the type of the RF interface information.

Referring to FIG. 4C, the RF interface information is recorded in the nwkc Node Capabilities field.

The nwkc Node Capabilities field includes 8 bits.

The RF interface information of FIG. 4B is recorded in a "reserved" field 440 including 4 bits "4-7".

Figure 5:
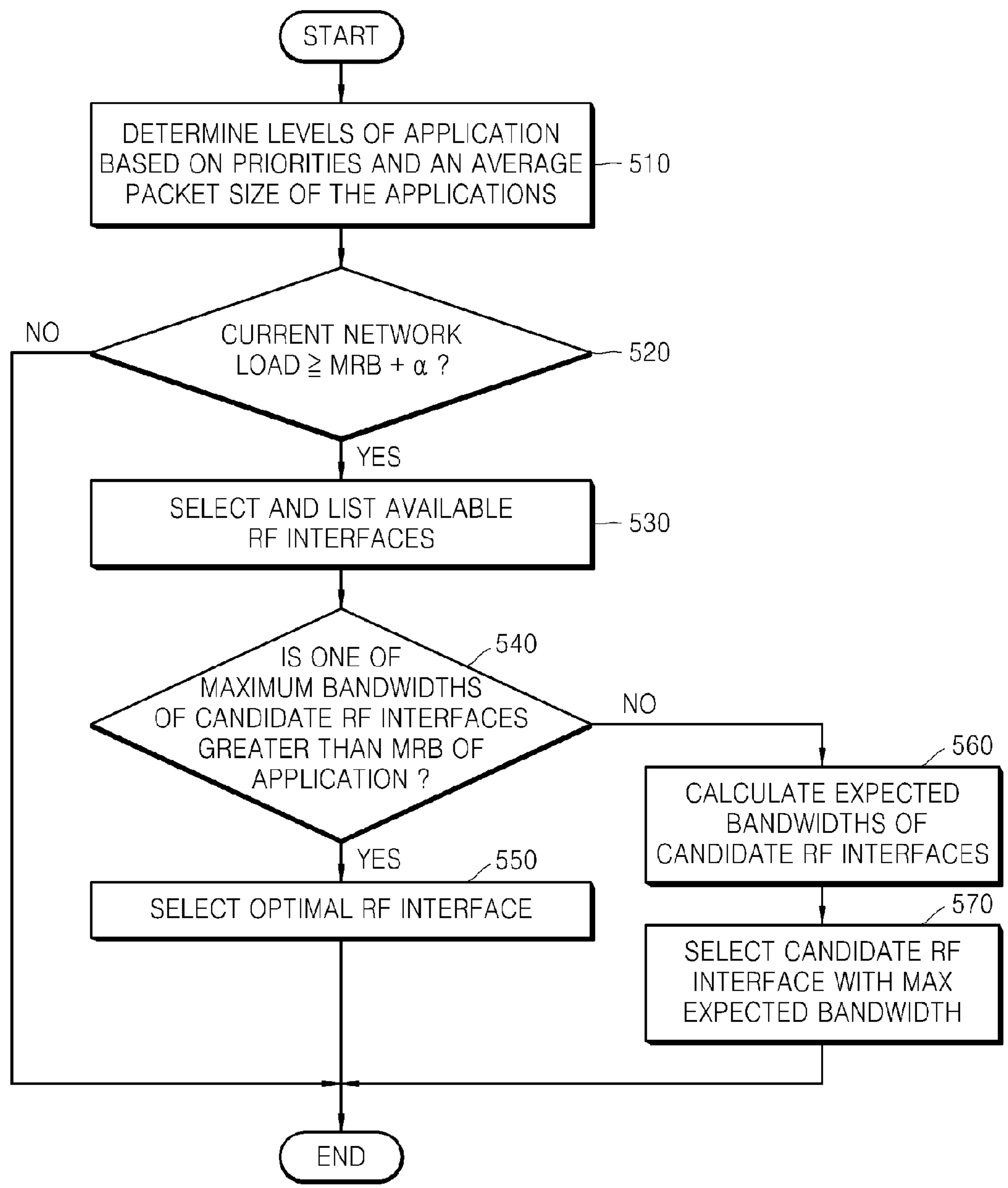
FIG. 5 is a detailed flowchart of an operation of selecting an optimal RF interface of FIG. 3.

FIG. 5 is a detailed flowchart of an operation (330) of selecting an optimal RF interface of FIG. 3.

To explain the operation of selecting the optimal RF interface, it is assumed that three RF interfaces are used. However, this is only an example and any number of RF interfaces may be used. The three RF interfaces have maximum bandwidths, respectively.

A level of an application is determined by prioritizing the application that is used at present according to the characteristics of services of the application, and by reflecting a weight according to an average packet size (APS) of the application (operation 510). The characteristics of services may be, for example, real-time, non-real-time, or best effort (BE), etc. Each level has a requirement bandwidth.

With respect to prioritizing of the application, for example, video/voice applications are applications that offer real-time services, and thus would have a first priority. A file transfer protocol (FTP) application is an application offering a non-real-time service and would have a second priority. A Web E-mail application is an application that provides a best effort (BE) service and would have a third priority, etc. Each application also has an APS. Thus, the application is rated as "priority+APS×WO", where WO is a weight used to select the optimal RF interface.

Therefore, the application that is to be used at present is assigned a level according to the rating. The three levels of the applications have requirement bandwidths, respectively. For example, the three levels of the application have requirement bandwidths 1, 2, and 3, respectively.

Thereafter, a current network load is compared to a minimum requirement bandwidth of an application level that is to be currently used so as to select an RF interface having a maximum bandwidth.

More specifically, it is determined whether the current network load is equal to or greater than a previously set value. The previously set value may be "minimum requirement bandwidth (MRB)+α" (operation 520). Here, α is determined as an experimental value. The MRB may be determined according to Equation 1 below.

$$\text{MRB}=\text{required bandwidth of the currently selected application}/2 \quad \text{Equation 1}$$

Thereafter, if the current network load is equal to or greater than "minimum requirement bandwidth (MRB)+α", the currently available three RF interfaces having maximum bandwidths are selected, and aligned (operation 530). For example, the RF interface having a first maximum bandwidth is set as a first candidate RF interface, the RF interface having a second maximum bandwidth is set as a second candidate interface, and the RF interface having a third maximum bandwidth is set as a third candidate RF interface.

Thereafter, it is determined whether the maximum bandwidth of the first, second, or third candidate RF interface is greater than the MRB of a currently available application (operation 540).

Thereafter, if it is determined that the maximum bandwidth of the first, second, or third candidate RF interface is greater than the MRB of the currently available application, the first, second, or third candidate RF interface is selected as the optimal RF interface (operation 550), and, if it is determined that the expected bandwidth of the first, second, or third candidate RF interface is not greater than the MRB of the currently available application, an expected bandwidth of the first, second, and third candidate RF interface is calculated (operation 560).

Thereafter, the first, second, or third candidate RF interface having a maximum expected bandwidth is selected as the optimal RF interface (operation 570).

In this regard, the expected bandwidth of the RF interface is calculated according to Equation 2 below.

$$\text{Expected bandwidth of RF interface}=(\text{bandwidth of current RF interface}\times W1)+(\text{AFR}\times W2)+(\text{APR}+W3)$$

Here, W1~W3 denote weights used to select an RF interface, an average flow rate (AFR) denotes an average packet size while data is provided, and average packet rate (APR) denotes an amount of packets while the data is provided.

That is, AFR may represent "bytes/length" and an APR may represent "packets/length". "Length" denotes a service flow duration obtained by subtracting a service flow start timestamp from a service flow end timestamp.

Figure 6A:
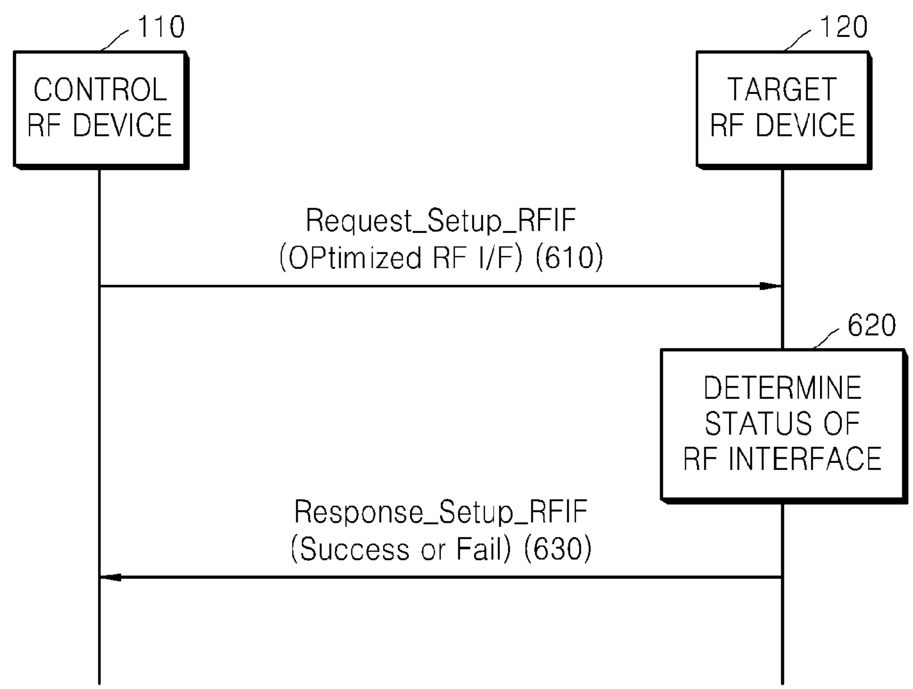
FIG. 6A is a flowchart of a signal used to request and respond in regard to establishment of an RF interface during an operation of negotiating about RF interface information of FIG. 3.

FIG. 6A is a flowchart of a signal used to request and respond in regard to establishment of an RF interface during an operation of negotiating about RF interface information of FIG. 3.

Referring to FIG. 6A, the control RF device 110 selects an optimal RF interface and transmits a request message regarding establishment of the selected RF interface to the target RF device 120 (operation 610).

Thereafter, the target RF device 120 determines a status of the requested RF interface (operation 620).

Thereafter, the target RF device 120 sends a response message regarding the establishment of the requested RF interface to the control RF device 110 (operation 630). The response message includes information regarding success and failure of the establishment of the requested RF interface.

Figure 6B:
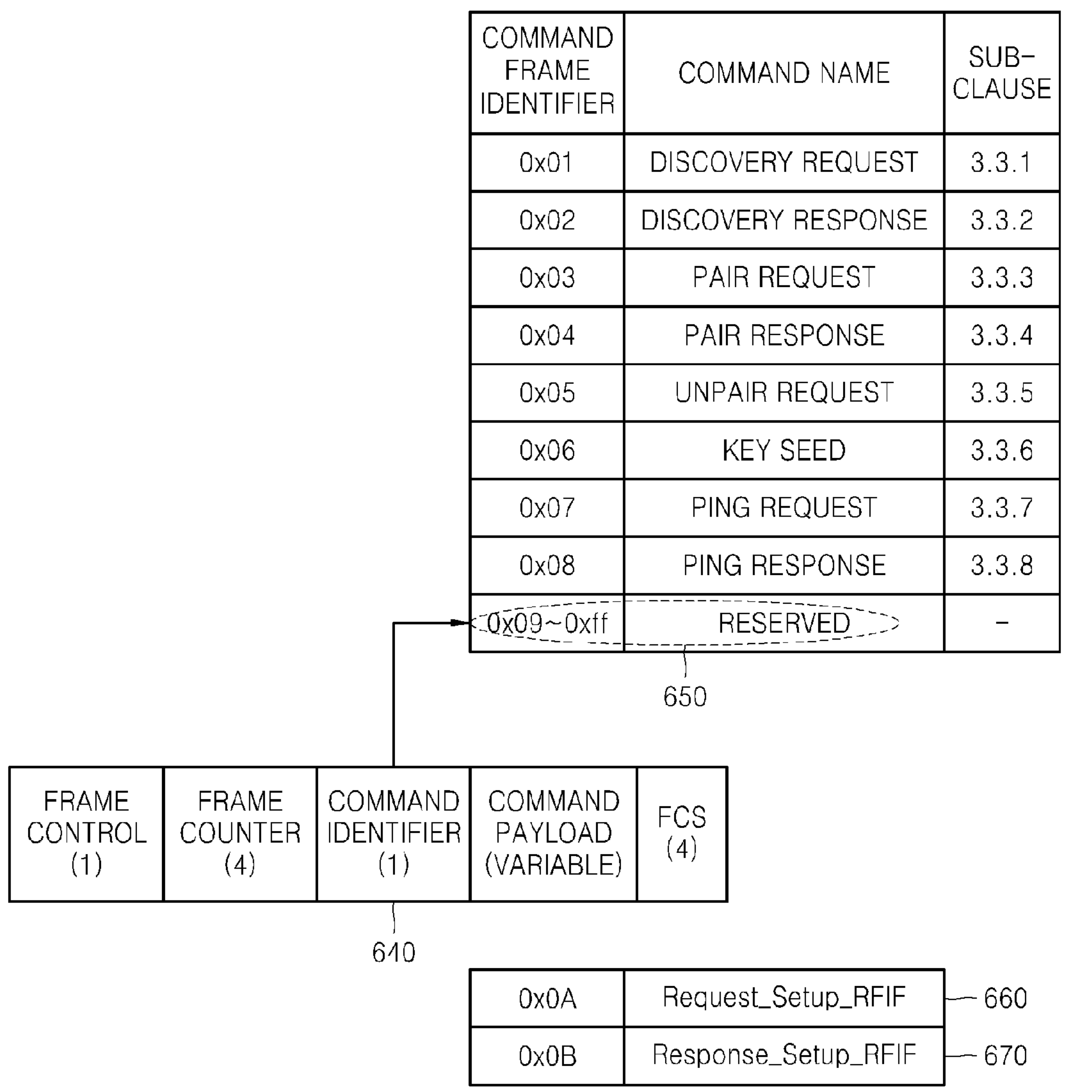
FIG. 6B illustrates a format of request and response messages regarding the establishment of the RF interface of FIG. 6A.

FIG. 6B illustrates a format of the request and response messages regarding the establishment of the RF interface of FIG. 6A.

Referring to FIG. 6B, the format of the request and response messages regarding the establishment of the RF interface includes a Frame Control field, a Frame Counter field, a Command Identifier field 640, a Command Payload field, and a frame check sequence (FCS) field.

The Command Identifier field 640 includes a command frame identifier defining command names.

"Request_Setup_FRIF" 660 corresponding to a request for establishing the RF interface and "Response_Setup_RFIF" 670 corresponding to a response in regard to establishing the RF interface are established in a "reserved" field 650 corresponding to command frame identifier "0x09-0xff".

Figure 7:
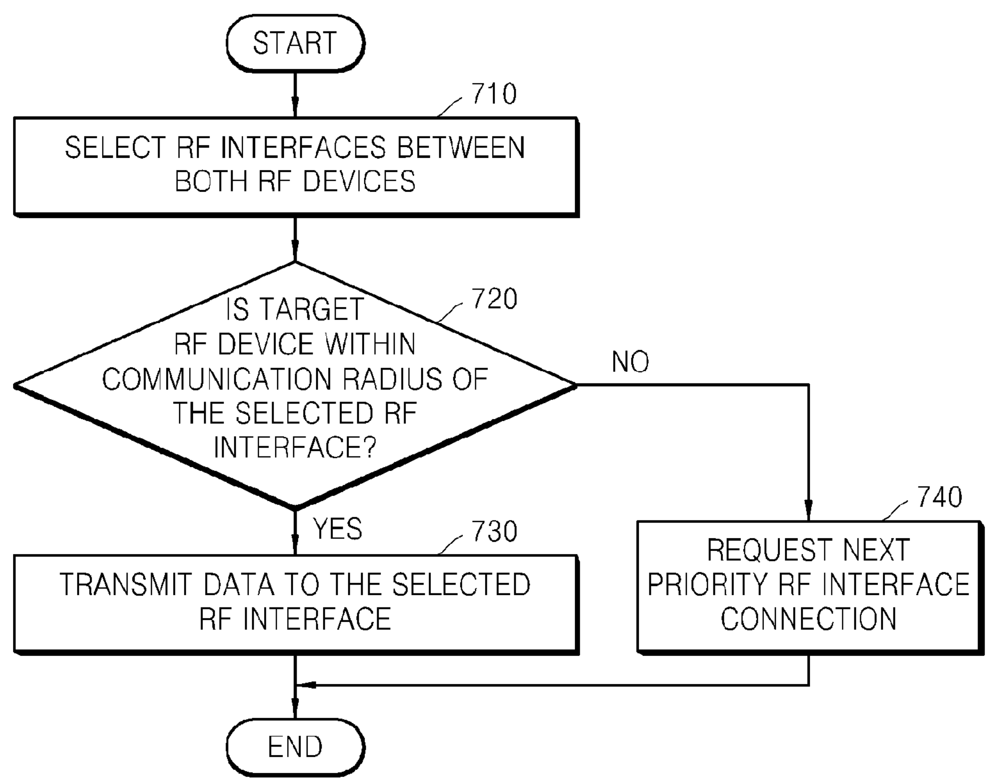
FIG. 7 is a detailed flowchart of an operation of negotiating about RF interface information of FIG. 3.

FIG. 7 is a detailed flowchart of negotiating about the RF interface operation (operation 340) of FIG. 3.

Referring to FIG. 7, negotiation regarding an availability of a selected RF interface is performed between the control RF device 110 and the target RF device 120, and the selected RF interface is established therebetween (operation 710).

More specifically, the control RF device 110 selects an RF interface, sends information regarding the selected RF interface to the target RF device 120, and receives a message from the target RF device 120 about whether to establish the selected RF interface. In this regard, if the RF interface is established therebetween, the selected RF interface is activated in the target RF device 120.

Thereafter, the control RF device 110 determines whether the target RF device 120 is within a communication radius of the selected RF interface by using a PING message (operation 720).

The control RF device 110 exchanges the PING message with the target RF device 120 in order to determine whether the target RF device 120 is within the communication radius of the selected RF interface. For example, if the control RF device 110 requests the target RF device 120 for a packet message and does not receive a response message from the target RF device 120 up to three times, it is determined that the target RF device 120 is not within the communication radius of the selected RF interface.

Thereafter, if it is determined that the target RF device 120 is within the communication radius of the selected RF interface, the control RF device 110 transmits data to the target RF device 120 through the selected RF interface (operation 730).

However, if it is determined that the target RF device 120 is not within the communication radius of the selected RF interface, the control RF device 110 requests the target RF device 120 to connect to a next priority RF interface (operation 740).

The present inventive concept can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the present inventive concept has been particularly shown and described with reference to exemplary embodiments thereof, it will be understood by those of ordinary skill in the art that various changes in form and details may be made therein without departing from the spirit and scope as defined by the following claims.

What is claimed is:

1. A method of selecting a wireless personal area network (WPAN) based adaptive radio frequency (RF) interface, the method comprising:

establishing a network connection by performing WPAN discovery and pairing between a control RF device and a target RF device to establish a control channel, the establishing comprising receiving radio frequency for consumer electronics (RF4CE) nwkcNodeCapabilities information from the target RF device, wherein a reserved field of the nwkcNodeCapabilities information includes an indication of a type of RF interface supported by the target RF device;

obtaining RF interface information from the received RF4CE nwkcNodeCapabilities information;

selecting an RF interface from among a plurality of RF interfaces using the obtained RF interface information, based on characteristics of applications and a network load;

establishing the selected RF interface with the target RF device;

determining whether the RF interface is available according to a current availability status of the network; and searching for another RF interface by establishing the network connection and establishing the searched another RF interface with the target RF device based on the determining that the RF interface is unavailable;

wherein the control channel is established by using an out-of-band control channel.

2. The method of claim 1, wherein the current availability status of the network is determined periodically or according to a request.

3. The method of claim 1, wherein the performing of the WPAN discovery and pairing comprises: providing RF interfaces between the control RF device and the target RF device by using a previously established network node qualification field.

4. The method of claim 1, wherein the selecting of the RF interface comprises:

determining a level of an application that is to be used;

selecting RF interfaces and aligning the currently available RF interfaces according to their bandwidths based on a current network load; and determining an optimal RF interface by comparing bandwidths of the RF interfaces with a minimum requirement bandwidth of the application.

5. The method of claim 4, wherein the determining of the level of application comprises: prioritizing the application that is to be used according to characteristics of the application and determining the level of the application by reflecting a weight on an average packet size (APS) of the application.

6. The method of claim 4, wherein the selecting and aligning of the RF interfaces comprises: selecting and aligning the currently available RF interfaces having the maximum bandwidth if the current network load is greater than or equal to a required bandwidth of a currently used application.

7. The method of claim 4, wherein the determining of the optimal RF interface comprises:

comparing maximum bandwidths of the RF interfaces with the MRB of the application; and selecting the RF interface having the maximum bandwidth greater than the MRB of the application, if there is no RF interface having the maximum bandwidth greater than the MRB of the application, calculating expected bandwidths of the RF interfaces, and selecting the RF interface having a maximum expected bandwidth as an optimal RF interface.

8. The method of claim 7, wherein the expected bandwidth of a RF interface is given by the equation:

$$\text{Expected bandwidth of RF interface}=(\text{bandwidth of current RF interface}\times W1)+(\text{AFR}\times W2)+(\text{APR}+W3),$$

wherein, W1~W3 denote weights used to select an RF interface, an average flow rate (AFR) denotes an APS while data is provided, and average packet rate (APR) denotes an amount of packets while the data is provided.

9. The method of claim 1, wherein establishing the RF interface with the target device comprises negotiating the selected RF interface with the target device, and the negotiating the selected RF interface comprises:

selecting the RF interface, sending information regarding the selected RF interface to the target RF device, and receiving a message indicating whether to establish the selected RF interface from the target RF device.

10. The method of claim 1, wherein establishing the RF interface with the target device comprises negotiating the selected RF interface with the target device, and the negotiating the selected RF interface comprises: exchanging a PING message to determine whether the target RF device is within a communication radius of the selected RF interface.

11. The method of claim 10, wherein, if it is determined that the target RF device is within the communication radius of the selected RF interface, the control RF device transmits data to the target RF device through the selected RF interface, and, if it is determined that the target RF device is not within the communication radius of the selected RF interface, the control RF device requests the target RF device to connect a next priority RF interface.

12. The method of claim 11, wherein whether the target RF device is within the communication radius of the selected RF interface is determined by using a response received from the target RF device.

13. An apparatus for selecting a WPAN based adaptive RF interface, the apparatus comprising:

a controller comprising a processor and configured to:

establish a network connection by performing WPAN discovery and pairing between a control RF device and a target RF device to establish a control channel, wherein the controller is configured to establish the network connection by receiving radio frequency for consumer electronics (RF4CE) nwkcNodeCapabilities information from the target RF device, wherein a reserved field of the nwkcNodeCapabilities information includes an indication of a type of RF interface supported by the target RF device;

obtain RF interface information from the received RF4CE nwkcNodeCapabilities information;

select an RF interface from the obtained RF interface information based on characteristics of applications and a network load;

establish the RF interface by negotiating about the selected RF interface with the target RF device;

determine whether the RF interface is available according to a current availability status of the network; and search for another RF interface by establishing the network connection and establish the searched another RF interface with the target RF device based on the determination that the RF interface is unavailable;

wherein the control channel is established by using an out-of-band control channel.

14. A radio frequency (RF) device comprising:

a communication interface comprising a plurality of RF interfaces, each RF interface using a different interface method;

a controller comprising a processor that selects an RF interface of the plurality of RF interfaces, using RF interface information obtained through a wireless personal area network (WPAN) network connection based on characteristics of applications and a network load; and wherein the communication interface communicates data used for communication setup in order to perform RF communication, to the RF interface selected by the controller, wherein the controller is configured to:

establish a network connection by performing WPAN discovery and pairing between a control RF device and a target RF device to establish a control channel, wherein the controller is configured to establish the network connection by receiving radio frequency for consumer electronics (RF4CE) nwkcNodeCapabilities information from the target RF device, wherein a reserved field of the nwkcNodeCapabilities information includes an indication of a type of RF interface supported by the target RF device;

obtain an RF interface of the target RF device from the received RF4CE nwkcNodeCapabilities information;

select an RF interface from the obtained RF interface information based on the characteristics of the applications and the network load;

establish the RF interface by negotiating about the selected RF interface with the target RF device;

determine whether the RF interface is available according to a current availability status of the network; and search for another RF interface by establishing the network connection and establish the searched another RF interface with the target RF device based on the determination that the RF interface is unavailable;

wherein the control channel is established by using an out-of-band control channel.

15. The RF device of claim 14, further comprising: a display that displays a type of the RF interface selected by the controller.

16. A non-transitory computer readable storage medium having recorded thereon a program for executing a method comprising:

establishing a network connection by performing WPAN discovery and pairing between a control RF device and a target RF device to establish a control channel, the establishing comprising receiving radio frequency for consumer electronics (RF4CE) nwkcNodeCapabilities information from the target RF device, wherein a reserved field of the nwkcNodeCapabilities information includes an indication of a type of RF interface supported by the target RF device;

obtaining radio frequency (RF) interface information from the received RF4CE nwkcNodeCapabilities information;

selecting an RF interface from among a plurality of RF interfaces using the obtained RF interface information, based on characteristics of applications and a network load;

establishing the selected RF interface by negotiating about the selected RF interface with the target RF device;

determining whether the RF interface is available according to a current availability status of the network; and searching for another RF interface by establishing the network connection and establishing the searched another RF interface with the target RF device based on the determining that the RF interface is unavailable;

wherein the control channel is established by using an out-of-band control channel.

* * * * *